US010445743B2

(12) United States Patent
Cheney et al.

(10) Patent No.: US 10,445,743 B2
(45) Date of Patent: Oct. 15, 2019

(54) NON-SERIALIZED ELECTRONIC PRODUCT REGISTRATION SYSTEM AND METHOD OF OPERATING SAME

(71) Applicant: e2interactive, Inc., Atlanta, GA (US)

(72) Inventors: Brian Cheney, Redmond, WA (US); Peter J. Junger, Redmond, WA (US)

(73) Assignee: e2Interactive, Inc., Atlanta, GA (US)

( * ) Notice: Subject to any disclaimer, the term of this patent is extended or adjusted under 35 U.S.C. 154(b) by 819 days.

(21) Appl. No.: 14/223,345

(22) Filed: Mar. 24, 2014

(65) Prior Publication Data

US 2014/0207690 A1 Jul. 24, 2014

Related U.S. Application Data

(63) Continuation of application No. 13/486,513, filed on Jun. 1, 2012, now Pat. No. 8,712,869, which is a continuation of application No. 10/283,357, filed on Oct. 30, 2002, now Pat. No. 8,209,226.

(60) Provisional application No. 60/331,442, filed on Nov. 15, 2001.

(51) Int. Cl.
*G06Q 30/00* (2012.01)
*G06Q 20/20* (2012.01)
*G06Q 30/06* (2012.01)

(52) U.S. Cl.
CPC ......... *G06Q 30/012* (2013.01); *G06Q 20/203* (2013.01); *G06Q 30/06* (2013.01); *G06Q 30/0633* (2013.01)

(58) Field of Classification Search
USPC .......................................................... 705/30
See application file for complete search history.

(56) References Cited

U.S. PATENT DOCUMENTS

| 789,106 A | 5/1905 | Seymour |
|---|---|---|
| 1,330,368 A | 2/1920 | Boos |
| 1,393,489 A | 10/1921 | Boos |

(Continued)

FOREIGN PATENT DOCUMENTS

| DE | 3 315 724 | 10/1984 |
|---|---|---|
| EP | 0 068 642 | 1/1983 |

(Continued)

OTHER PUBLICATIONS

Information Disclosure Statement filed in U.S. Appl. No. 09/509,021, dated Oct. 26, 2001.

(Continued)

*Primary Examiner* — Garcia Ade
(74) *Attorney, Agent, or Firm* — Landmark Intellectual Property Law, PLLC

(57) ABSTRACT

A non-serialized electronic product registration (ER) system and method which enables return qualification information to be provided upon request for non-serialized products. Retailer specific return policies are enforced by providing the ER system with retailer return policies for UPCs, SKUs, model numbers and/or other non-unique product identifiers. The retailer periodically provides information to the ER system that indicates the last date on which products having a particular non-unique identifier have been sold. The ER system then determine the last date on which such products can be returned and provides non-serialized return qualification information to the retailer upon request.

9 Claims, 4 Drawing Sheets

(56) References Cited

U.S. PATENT DOCUMENTS

| | | | |
|---|---|---|---|
| 1,476,819 A | 12/1923 | Hope |
| 4,312,037 A | 1/1982 | Yamakita |
| 4,317,957 A | 3/1982 | Sendrow |
| 4,414,467 A | 11/1983 | Gould et al. |
| 4,458,802 A | 7/1984 | MacIver et al. |
| 4,563,739 A | 1/1986 | Gerpheide et al. |
| 4,598,810 A | 7/1986 | Shore et al. |
| 4,668,150 A | 5/1987 | Blumberg |
| 4,734,005 A | 3/1988 | Blumberg |
| 4,750,119 A | 6/1988 | Cohen et al. |
| 4,789,054 A | 12/1988 | Shore et al. |
| 4,792,018 A | 12/1988 | Humble et al. |
| 4,803,348 A | 2/1989 | Lohrey et al. |
| 4,812,629 A | 3/1989 | O'Neil et al. |
| 4,814,592 A | 3/1989 | Bradt et al. |
| 4,839,505 A | 6/1989 | Bradt et al. |
| 4,858,743 A | 8/1989 | Paraskevakos et al. |
| 4,866,661 A | 9/1989 | De Prins |
| 4,871,054 A | 10/1989 | Murray |
| 4,884,212 A | 11/1989 | Stutsman |
| 4,893,705 A | 1/1990 | Brown |
| 4,896,024 A | 1/1990 | Morello et al. |
| 4,903,815 A | 2/1990 | Hirschfeld et al. |
| 4,967,906 A | 11/1990 | Morello et al. |
| 4,984,155 A | 1/1991 | Geier et al. |
| 4,997,076 A | 3/1991 | Hirschfeld et al. |
| 5,007,518 A | 4/1991 | Crooks et al. |
| 5,020,958 A | 6/1991 | Tuttobene |
| 5,028,766 A | 7/1991 | Shah |
| 5,042,686 A | 8/1991 | Stucki |
| 5,057,677 A | 10/1991 | Bertagna |
| 5,128,520 A | 7/1992 | Rando et al. |
| 5,128,527 A | 7/1992 | Kawai et al. |
| 5,133,441 A | 7/1992 | Brown |
| 5,139,384 A | 8/1992 | Tuttobene |
| 5,143,193 A | 9/1992 | Geraci |
| 5,159,560 A | 10/1992 | Newell et al. |
| 5,216,612 A | 6/1993 | Cornett et al. |
| 5,231,569 A | 7/1993 | Myatt et al. |
| 5,256,863 A | 10/1993 | Ferguson et al. |
| 5,257,741 A | 11/1993 | Rode et al. |
| 5,273,183 A | 12/1993 | Tuttobene |
| 5,311,424 A | 5/1994 | Mukherjee et al. |
| 5,372,386 A | 12/1994 | Mills |
| 5,375,240 A | 12/1994 | Grundy |
| 5,384,449 A | 1/1995 | Pierce |
| 5,414,252 A | 5/1995 | Shinoda et al. |
| 5,416,306 A | 5/1995 | Imahata |
| 5,457,307 A | 10/1995 | Dumont |
| 5,478,990 A | 12/1995 | Montanari et al. |
| 5,520,990 A | 5/1996 | Rotermund |
| 5,521,815 A | 5/1996 | Rose, Jr. |
| 5,537,314 A | 7/1996 | Kanter |
| 5,541,394 A | 7/1996 | Kouchi et al. |
| 5,581,064 A | 12/1996 | Riley et al. |
| 5,602,377 A | 2/1997 | Beller et al. |
| 5,621,201 A | 4/1997 | Langhans |
| 5,671,279 A | 9/1997 | Elgamal |
| 5,712,989 A | 1/1998 | Johnson et al. |
| 5,721,832 A | 2/1998 | Westrope et al. |
| 5,729,693 A | 3/1998 | Holda-Fleck |
| 5,737,726 A | 4/1998 | Cameron et al. |
| 5,745,036 A | 4/1998 | Clare |
| 5,754,981 A | 5/1998 | Veeneman |
| 5,765,143 A | 6/1998 | Sheldon |
| 5,799,285 A | 8/1998 | Klingman |
| 5,804,803 A | 9/1998 | Cragun et al. |
| 5,857,175 A | 1/1999 | Day et al. |
| 5,878,401 A | 3/1999 | Joseph |
| 5,889,270 A | 3/1999 | Van Haagen et al. |
| 5,895,073 A | 4/1999 | Moore |
| 5,895,453 A | 4/1999 | Cook |
| 5,913,210 A | 6/1999 | Call |
| 5,918,213 A | 6/1999 | Bernard et al. |
| 5,918,214 A | 6/1999 | Perkowski |
| 5,943,424 A | 8/1999 | Berger |
| 5,949,335 A | 9/1999 | Maynard |
| 5,950,173 A | 9/1999 | Perkowski |
| 5,961,651 A | 10/1999 | Gittins |
| 5,966,450 A | 10/1999 | Hosford et al. |
| 5,968,110 A | 10/1999 | Westrope et al. |
| 5,978,774 A | 11/1999 | Rogers et al. |
| 5,984,508 A | 11/1999 | Hurley |
| 6,014,635 A | 1/2000 | Harris et al. |
| 6,016,480 A | 1/2000 | Houvener et al. |
| 6,018,719 A * | 1/2000 | Rogers .............. G06Q 20/202 |
| | | 705/21 |
| 6,025,780 A | 2/2000 | Bowers et al. |
| 6,029,139 A | 2/2000 | Cunningham et al. |
| 6,029,141 A | 2/2000 | Bezos et al. |
| 6,039,244 A | 3/2000 | Finsterwald |
| 6,049,778 A | 4/2000 | Walker et al. |
| 6,055,511 A | 4/2000 | Luebbering et al. |
| 6,064,979 A | 5/2000 | Perkowski |
| 6,085,167 A | 7/2000 | Iguchi |
| 6,085,172 A * | 7/2000 | Junger ............... G06Q 10/083 |
| | | 705/28 |
| 6,105,001 A | 8/2000 | Masi et al. |
| 6,115,690 A | 9/2000 | Wong |
| 6,119,099 A | 9/2000 | Walker et al. |
| 6,119,164 A | 9/2000 | Basche |
| 6,125,352 A | 9/2000 | Franklin et al. |
| 6,131,088 A | 10/2000 | Hill |
| 6,134,533 A | 10/2000 | Shell |
| 6,148,249 A | 11/2000 | Newman |
| 6,154,738 A | 11/2000 | Call |
| 6,169,976 B1 | 1/2001 | White |
| 6,219,652 B1 | 4/2001 | Carter et al. |
| 6,222,914 B1 | 4/2001 | McMullin |
| 6,269,344 B1 | 7/2001 | Junger |
| 6,315,199 B1 | 11/2001 | Ito |
| 6,317,028 B1 | 11/2001 | Valiulis |
| 6,334,116 B1 | 12/2001 | Ganesan |
| 6,450,407 B1 | 9/2002 | Freeman |
| 6,463,421 B2 | 10/2002 | Junger |
| 6,536,659 B1* | 3/2003 | Hauser ................. G06Q 30/06 |
| | | 235/375 |
| 6,542,933 B1 | 4/2003 | Durst, Jr. et al. |
| 6,550,685 B1 | 4/2003 | Kindberg |
| 6,554,187 B2 | 4/2003 | Otto |
| 6,591,098 B1 | 7/2003 | Sheih |
| 6,592,035 B2 | 7/2003 | Mandile |
| 6,609,106 B1 | 8/2003 | Robertson |
| 6,612,487 B2 | 9/2003 | Tidball |
| 6,622,015 B1 | 9/2003 | Himmel |
| 6,633,877 B1 | 10/2003 | Saigh |
| 6,697,812 B1 | 2/2004 | Martin |
| 6,748,365 B1 | 6/2004 | Quinlan |
| 6,754,637 B1 | 6/2004 | Stenz |
| 6,757,663 B1 | 6/2004 | Rogers et al. |
| 6,785,537 B2 | 8/2004 | Hicks |
| 6,827,260 B2 | 12/2004 | Stoutenburg |
| 6,837,426 B2 | 1/2005 | Tidball |
| 6,847,935 B1 | 1/2005 | Solomon |
| 6,865,544 B1 | 3/2005 | Austin |
| 6,965,866 B2* | 11/2005 | Klein ..................... B25J 9/08 |
| | | 705/302 |
| 7,000,834 B2 | 2/2006 | Hind |
| 7,003,500 B1 | 2/2006 | Driessen |
| 7,035,813 B1 | 4/2006 | Cook |
| 7,090,138 B2 | 8/2006 | Rettenmeyer |
| 7,117,227 B2 | 10/2006 | Call |
| 7,118,478 B2 | 10/2006 | Fayter et al. |
| 7,124,941 B1 | 10/2006 | OConnell |
| 7,143,055 B1 | 11/2006 | Perkowski |
| 7,162,440 B2* | 1/2007 | Koons ................ G06Q 10/087 |
| | | 340/5.9 |
| 7,191,142 B1 | 3/2007 | Sandell |
| 7,249,097 B2 | 7/2007 | Hutchison |
| 7,281,653 B2 | 10/2007 | Beck |
| 7,311,249 B2 | 12/2007 | Smith |
| 7,343,406 B1 | 3/2008 | Buonanno |
| 7,353,178 B2 | 4/2008 | Gorski |

(56) References Cited

U.S. PATENT DOCUMENTS

| | | | |
|---|---|---|---|
| 7,376,572 B2* | 5/2008 | Siegel | G06Q 10/0833 705/1.1 |
| 7,415,429 B2 | 8/2008 | Rollins | |
| 7,660,721 B2 | 2/2010 | Williams | |
| 7,760,721 B2 | 2/2010 | Williams | |
| 8,036,953 B2 | 10/2011 | Hsu | |
| 8,190,449 B2 | 5/2012 | Grady | |
| 8,229,861 B1 | 7/2012 | Trandal | |
| 8,244,644 B2 | 8/2012 | Knipfer | |
| 8,321,302 B2 | 11/2012 | Bauer | |
| 8,332,323 B2 | 12/2012 | Stals | |
| 8,442,844 B1 | 5/2013 | Trandal | |
| 2002/0010627 A1* | 1/2002 | Lerat | G06Q 30/02 705/14.26 |
| 2002/0022966 A1 | 2/2002 | Horgan | |
| 2002/0032612 A1 | 3/2002 | Williams et al. | |
| 2002/0091593 A1 | 7/2002 | Fowler | |
| 2002/0116274 A1 | 8/2002 | Hind et al. | |
| 2003/0004737 A1 | 1/2003 | Conquest | |
| 2003/0083930 A1 | 5/2003 | Burke | |
| 2003/0094494 A1 | 5/2003 | Blanford et al. | |
| 2003/0126034 A1 | 7/2003 | Cheney et al. | |
| 2003/0126079 A1 | 7/2003 | Roberson | |
| 2003/0141358 A1 | 7/2003 | Hudson et al. | |
| 2003/0144910 A1 | 7/2003 | Flaherty | |
| 2003/0149573 A1 | 8/2003 | Lynton | |
| 2003/0174823 A1 | 9/2003 | Justice | |
| 2003/0216969 A1 | 11/2003 | Bauer | |
| 2004/0015418 A1 | 1/2004 | Dooley | |
| 2004/0054900 A1 | 3/2004 | He | |
| 2004/0088230 A1 | 5/2004 | Elliott | |
| 2004/0128395 A1 | 7/2004 | Miyazaki | |
| 2004/0153344 A1 | 8/2004 | Bui et al. | |
| 2004/0153402 A1 | 8/2004 | Smith | |
| 2004/0195341 A1 | 10/2004 | Lapstun et al. | |
| 2004/0224660 A1 | 11/2004 | Anderson | |
| 2005/0049927 A1 | 3/2005 | Zelanis | |
| 2005/0125292 A1 | 6/2005 | Kassab | |
| 2005/0149387 A1 | 7/2005 | O'Shea | |
| 2005/0240473 A1 | 10/2005 | Ayers | |
| 2006/0058011 A1 | 3/2006 | Vanska | |
| 2006/0129456 A1 | 6/2006 | Walker | |
| 2006/0136299 A1 | 6/2006 | Ruhmkorf | |
| 2006/0175401 A1 | 8/2006 | Roberts | |
| 2006/0190337 A1 | 8/2006 | Ayers | |
| 2007/0143177 A1 | 6/2007 | Graves | |
| 2008/0179390 A1 | 7/2008 | Harjani | |
| 2008/0186174 A1 | 8/2008 | Alexis | |
| 2008/0256600 A1 | 10/2008 | Schrijen | |
| 2008/0262948 A1 | 10/2008 | Grady | |
| 2009/0048934 A1 | 2/2009 | Haddad | |
| 2009/0076870 A1 | 3/2009 | Hammond | |
| 2009/0240516 A1 | 9/2009 | Palestrant | |
| 2009/0319352 A1 | 12/2009 | Boyle | |
| 2010/0095357 A1 | 4/2010 | Willis | |

FOREIGN PATENT DOCUMENTS

| | | |
|---|---|---|
| EP | 0 191 636 | 8/1986 |
| EP | 0 349 284 | 1/1990 |
| EP | 0 845 749 | 6/1998 |
| EP | 0 862 154 | 9/1998 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| JP | 02-139698 | 5/1990 |
| JP | 405178422 A | 7/1993 |
| JP | 405342482 A | 12/1993 |
| JP | 10188141 | 7/1998 |
| JP | 11066176 | 3/1999 |
| SA | 0 286 130 | 10/1988 |
| WO | 87/00948 | 2/1987 |
| WO | 88/02524 | 4/1988 |
| WO | 88/06771 | 9/1988 |
| WO | 89/09460 | 10/1989 |
| WO | 92/01273 | 1/1992 |
| WO | 99/33016 | 7/1999 |

OTHER PUBLICATIONS

Information Disclosure Statement filed in U.S. Appl. No. 09/065,552, dated Jul. 19, 1999.

Information Disclosure Statement filed in U.S. Appl. No. 08/725,259, dated Oct. 5, 1998.

Nintendo Point of Purchase Mail-In Card.

1994 Nintendo Product Returns Policies and Procedures.

1995 Nintendo Product Returns Policies and Procedures.

1996 Nintendo Product Returns Policies and Procedures.

1992 Nintendo Product Returns Policy.

John Longwell, "Robec Links Its 18 Sales Facilities Via Newly Adopted NetWare System", Computer Reseller News, Sep. 6, 1993.

Software Maker Promises Many Happy Returns, Drug Topics, Mar. 4, 1996, vol. 140, No. 5, pp. 124-128.

Direct Return 2000, Software Overview, http://www.directreturn.com/software_overview.htm, Oct. 2, 2000.

Amazon.com Returns Policy, Our Return Policy is Simple, Jun. 20, 2000, Amazon.com, www.amazon.com/exec/obidos/subst/help/returns-policy.html, pp. 1-2.

Leyden, "Burgled mum finds stolen iPod on eBay," The Register, May 17, 2005, 1 page.

"Man accused in Lego selling scam," http://www.kptv.com/Global/story.asp?S=4137050&nav=muni156_2, Nov. 18, 2005, 1 page.

Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.

PR Newswire, "CompuServe Introduces Electronic Product Registration Software", PR Newswire Association, Inc., Mar. 10, 1994, 2 pages.

Longwell, "Western Digital Wins—Price/performance gives driver maker victory margin", Computer Reseller News, CMP Publications, Inc., Jun. 28, 1993, 3 pages.

Grace, "ABCD Looks to Adopt EDI Transaction Sets", Computer Reseller News, CMP Publications, Inc., Jun. 28, 1993, 2 pages.

Discount Store News, "New Policy System can Par Suspect Returns, Cut Losses", Discount Store News, Lebhar-Friedman Inc., Jan. 1, 1996, 2 pages.

Synchronics® User Manual: Point of Sale, Version 6.5, Apr. 1993 (ON 004464-ON 005116).

Synchronics™ User Manual: Inventory Plus, Version 6.5, Apr. 1993 (ON 005117-ON 005892).

Collins, David Jarrett and Nancy Nasuti Whipple, Using Bar Code: Why Its Taking Over, Second Edition (ON 003696-ON 004031).

Birnbaum, Henry, General Information Manual: IBM Circulation Control at Brooklyn College Library, 29pp. (ON 001822-ON 001850.

White, Howard S., Library Technology Reports, Mar.-Apr. 1982, vol. 18,No. 2, pp. 178-184 (ON 001851-ON 001858).

Cooper, Michael D., Design of Library Automation Systems, pp. 83-109 (ON 1859-ON 001873).

Corbin, John, Developing Computer-Based Library Systems, pp. 144-149 (ON 001874-ON 001877).

DataPhase, Inc. Automated Circulation System, 43 pages (ON 001878-ON 001904).

Dranov, Paula, Automated Library Circulation Systems, 1977-78, pp. 24-47 (ON 001905-ON 001929).

Hoadley, Irene Braden and A. Robert Thorson, An Automated On-Line Circulation System: Evaluation, Development, Use, 1973, 19 pp. (ON 001930-ON 001948).

Meyer, James, "NOTIS: The System and Its Features", Library Hi Tech, Issue 10, vol. 3, No. 2, 1985, pp. 81-89 (ON 001949-ON 001959).

Dowlin, Kenneth E., "MAGGIE III: The Prototypical Library System", Library Hi Tech, Issue 16, vol. 4, No. 4, Winter 1986, pp. 7-15 (ON 001960-ON 001970).

(56) References Cited

OTHER PUBLICATIONS

Matthews, Joseph R., "Graphical User Interfaces GUI in Library Products", Library Technology Reports, vol. 32, No. 1, Jan. 1996, p. 53 (ON 001972-ON 001976).
Saffady, William, "Integrated Library Systems for Microcomputers and Mainframes: A Vendor Study", Library Techology Reports, vol. 30, No. 1, Jan. 1994, p. 5 (ON 001977-ON 002087).
Saffady, William, "Vendors of Integrated Library Systems for Minicomputers and Mainframes: An Industry Report, part 1", Library Techology Reports, vol. 33, No. 2, Mar. 1997, p. 161 (ON 002088-ON 002096).
Saffady, William, "Vendors of Integrated Library Systems for Microcomputers and Mainframes: An Industry Report, part 2", Library Techology Reports, vol. 33, No. 3, May 1997, p. 277 (ON 002097-ON 002138).
Salton, Gerard, Dynamic Information and Library Processing, pp. 62-69 (ON 002139-ON 002143).
Grosch, Audrey N., Distributed Computing and the Electronic Library: Micros to Superminis, pp. 78-79 (ON 002144-ON 002146).
Reynolds, Dennis, Library Automation: Issues and Applications, pp. 42-49 and pp. 146-149 (ON 002147-ON 002153).
Salmon, Stephen R., Library Automation Systems, p. 239 (ON 002154-ON 002155).
Synchronics Software Product Information guide, 95 pages.
Direct Return 2000, Software Overview, http://www.directreturn.com/software_overview.htm, Copyright © 2000 Pharmacy Software Solutions, Inc.
"Retailing in Cyberspace", Narda News, Apr. 1995, pp. 21-22.
PR Newswire, "Escada Offers a Garden Variety for Spring", PR Newswire Association, Inc., Mar. 10, 1994, 2 pages.
Automotive News, "Reynolds, ADP differ on superhighway progress", Crain Communications, Inc., Apr. 11, 1994, 3 pages.
Computer Reseller News, "Case Study; Tapping the Channel's 'Best in Class' ", CMP Publications, Inc., Jan. 30, 1995, 2 pages.
Rigney, "User Migrates to Windows NT", InternetWeek, CMP Publications, Inc., Jan. 10, 1994, 2 pages.
Business Wire, "Multimillion-dollar Health-care Products", Business Wire, Inc., Dec. 15, 1993, 2 pages.
Margulis, "Reclaim: an efficient way to handle damaged products", U.S. Distribution Journal, BMT Publications Inc., Mar. 15, 1992, 7 pages.
Jiji Press Ticker Service, "MITI Working Out Business Practice Guidelines", JiJi Press Ltd., Apr. 20, 1990, 1 page.
Jiji Press Ticker Service, "JCCI Issues Booklet to Explain Distribution", JiJi Press Ltd., Jul. 20, 1989, 1 page.

Business Wire, "Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.
LaPlante, "Rugby Darby; From proprietary host to a distributed LAN-based architecture in 2 years", InfoWorld, InfoWorld Media Group, Nov. 15, 1993, 4 pages.
Witt et al., "Distribution: a differentiator in 2000", Material Handling Engineering, Penton Publishing Inc., Oct. 1995, 15 pages.
Grotta, "Return to vendor: the right way to make mail-order returns", PC Sources, Information Access Company, a Thomson Corporation Company, ASAP Coastal Associates Publishing L.P., Feb. 1992, 10 pages.
Consumer Electronics, Warren Publishing, Inc., Consumer Electronics Personals, vol. 35, No. 6, p. 18.
Business Wire, "DataTrend receives award from AT&T Global Information Solutions", Business Wire, Inc., Nov. 7, 1995, 2 pages.
Quinn, "Why Wang took the third-party route", Information Access Company, a Thomson Corporation Company, ASAP Reed Publishing USA, vol. 30, No. 2, p. 30, Feb. 1991.
Rogers et al., "Going Backwards: Reverse Logistics Trends and Practices", Reverse Logistics Executive Council, 1998 (entire book).
IBM Systems Journal, vol. 14, No. 1, 1975, pp. 1-101.
CollegeTermPapers web page printout, "History of Fed Ex", www.collegetermpaper...rmPapers/Aviation/history_of_fed_ex.html (Aug. 24, 2001), 7 pages.
Rosenbloom, "Midnight Express", Inc., Jul. 2001, 4 pages.
Sleeper, "FedEx Pushes The Right Buttons to Remain No. 1 in Fast Shipping", Investors Business Daily, May 25, 2001, 2 pages.
Brewin et al., "Follow That Package!", Computer World, vol. 35, No. 12, Mar. 19, 2001, 4 pages.
Joachim, "FedEx Delivers on CEO's IT Vision", InternetWeek, Oct. 25, 1999, 4 pages.
Federal Express Information Packet, 56 pages (incl. cover and table of contents).
Sigafoos et al., "Absolutely Positively Overnight!: The Unofficial Corporate History of Federal Express", St. Luke Press, 1988, pp. 1-22.
Witt, "How to Master the Art of Returns: Automation is the Key", Material Handling Engineering, Jun. 1994, pp. 58-60.
Dilger, "The Other Direction", Manufacturing Systems, vol. 15, No. 10, pp. 12-13 (Oct. 1997).
"Computer City Moves to Consolidate Returns", Computer Retail Systems, vol. 6, No. 125, Jan. 22, 1998, 2 pages.
Dreamcom web page printout, www.dreamcomdirect.com/RMA.htm (May 25, 1997).

* cited by examiner

NON-SERIALIZED ELECTRONIC PRODUCT REGISTRATION SYSTEM AND METHOD OF OPERATING SAME

CROSS REFERENCE TO RELATED APPLICATIONS

This is a continuation of application Ser. No. 13/486,513 filed Jun. 1, 2012, which is a continuation application Ser. No. 10/283,357 filed Oct. 30, 2002, which claims the benefit of Provisional Application No. 60/331,442 filed Nov. 15, 2001, which is hereby incorporated by reference in this application.

BACKGROUND AND SUMMARY OF THE INVENTION

The present invention relates to electronic registration systems for purchased products. More particularly, the invention relates an improved electronic product registration system that enables non-serialized products to be effectively and efficiently incorporated into electronic registration systems.

Electronic registration (ER) systems enable eligibility information regarding return, warranty, replacement and/or repair of previously purchased products to be collected, stored and accessed for the primary purpose of enforcing policies regarding same. Exemplary electronic product registration (ER) systems are disclosed in U.S. Pat. Nos. 5,978,774 and 6,018,719, the disclosures of which are incorporated by reference herein in their entirety.

Electronic registration (ER) systems have, in the past, relied on the use of a unique identifier, such as a serial number, for each product that is purchased. The serial number is obtained at the point of sale for inclusion in a registration database, together with other information, such as a date of transaction. This database can then be accessed in connection with an attempted product return/warranty transaction for the purpose of determining if the product qualifies for return/warranty under applicable return/warranty criteria (which are also stored in or made available to the ER system). Such electronic registration systems may also be used in connection with repair and/or exchange transactions, in addition to returns, by enabling an accurate determination as to whether the product qualifies for any of these actions under the appropriate policies and criteria under which the product was originally sold.

The ER system uses pre-established return/repair policies and procedures that are programmed into the system so that the system can perform a check when a product is presented for return to determine if the product qualifies for return, replacement and/or warranty repair based on sales transaction information available in the ER system for the particular product at issue. Thus, known ER systems include a database of return qualification information (or warranty/replacement criteria) for various manufacturer's and/or retailers that enables the system to make an accurate determination with respect to whether or not a particular product or item (that is uniquely identified by the system using a serial number or other unique identifier) actually qualifies for return (or warranty/replacement) based on the appropriate qualification criteria. Such ER systems have greatly reduced improper and fraudulent returns and warranty claims.

ER systems have, in the past, used a unique identifier for each product that is registered, thereby enabling the system to provide return qualification information with respect to the particular product being returned. Voice recognition, dial-in or internet systems are used to access the ER database to obtain information on registered products. For example, the ER system may be accessed at the time a product is being presented for return in order to obtain return qualification information for that specific product. An example of a voice recognition (VRU) system that uses serial numbers to access an ER system is disclosed in PCT application No. PCT/US01/25296 filed Aug. 14, 2001, and entitled "Voice Recognition Method and Apparatus Using Dynamic Link Library", the disclosure of which is incorporated by reference herein. Due to the fact that the ER systems have been based on serialized products (i.e., products each having a unique serial number), the access systems used therewith have also been based on the use of serial numbers.

Due to the serialized nature of previous ER systems, products that do not include a unique identifier associated therewith have not been able to be incorporated into such ER systems. As a result, such non-serialized products have not been able to enjoy the many benefits provided by ER systems.

While ER systems have proven to be very useful in their current forms, additional improvements in such systems are still desired in order to provide additional functionality that will benefit customers, retailers and/or manufacturers. Thus, improvements in ER systems are needed in order to enable effective use thereof for non-serialized products, as well as serialized products. To this end, the instant invention provides an improved ER system that has increased functionality, by providing an enhancement to known ER systems that enables information on non-serialized products (i.e., products that do not have a unique identifier) to be incorporated into an ER system. The instant invention provides an improved ER system that enables non-serialized products to be easily and effectively incorporated into ER systems. The term "non-serialized" as used herein means items that are not uniquely identified relative (by some type of identifier, such as a serial number) to other similar products, thereby preventing the items from being distinguished from other items after manufacture, sale or the like.

In accordance with a main aspect of the instant invention, a method and system are provided for obtaining and using information on sales of non-serialized products for the primary purpose of reducing the number of unauthorized returns of purchased products. In accordance with a preferred embodiment of the invention, retailer specific information on sales of non-serialized products are collected by the ER system in an efficient manner and in a way that enables an educated decision to be made when a non-serialized product is presented for return as to whether it is possible for the product to qualify for return under applicable return policies or criteria. Thus, the improved ER system of the invention enables non-serialized data or identifiers to be used to access return/warranty qualification information that applies to a class or group of similar products. For example, in accordance with the invention, model numbers or other non-serialized data (such as UPC or SKU numbers) that do not uniquely identify a particular product can be entered into the ER system for the purpose of storing non-serialized product transaction information and later obtaining return and/or warranty qualification information for a product that is being presented for return. Thus, the invention enables electronic registration of non-serialized products, such as products that may not have been originally intended for electronic registration, due to, for example, their price, nature or other characteristics. The invention also enables products that have been sold without collecting serialized registration data to still be added to and benefit from ER systems.

In accordance with a main feature of the invention, retailers provide information on a periodic basis which identifies when and which non-serialized products have been sold by the retailer. The ER system stores this information together with information on applicable return policies relating to the sold non-serialized products. By knowing the last date on which a particular type of product (but not the exact product) was sold by a retailer, the ER system is able to determine whether it is possible, at the time a product of this type is presented for return, that the product could qualify for return. For example, by knowing that a specific retailer last sold a product having a certain UPC 100 days ago, the ER system is able to inform the retailer upon inquiry that it is impossible that the product qualifies for return under the retailers 90 day return policy. Thus, a key aspect of the invention involves obtaining from participating retailers (or other entity) information indicating when certain types of products (e.g., products having the same UPC or other non-unique identifier) were last sold by the retailers, respectively. In one embodiment, the retailer transmits to the ER system each day at least one UPC for each product that the retailer sells that day. In this way, the ER system knows the last date on which each type of product was sold by each participating retailer. The system also includes return policies for each retailer, such as "no returns allowed after 90 days from purchase." Thus, when someone attempts to return a non-serialized product to a particular retailer, the ER system is able to assess transaction information for that retailer and for the specific type of product presented (e.g., UPC) and determine whether or not it is possible that the product qualifies for return under the retailer's specific return policy(ies). For instance, if the last date of sale for products having that UPC number, for example, was more than 90 days from the attempted return date, then it is impossible for that product to qualify for return under a 90 day return policy. Similarly, if the last date of sale for that UPC was within the 90 day period, it is possible that the product does qualify for return and the retailer can then make an educated and informed decision as to whether to accept the return. In this way, the invention is able to reduce the number of unauthorized returns by providing the retailer (or other party) with return qualification information, upon request, with respect to each type of product that it has sold, without requiring the use of a unique identifier.

The ER system of the invention provides and uses a database that is loaded with information on last sale date for products having certain model numbers, UPCs, SKUs or other non-unique identifiers, as well as applicable return and/or warranty criteria for products having these specific non-unique identifiers. The database may also contain serialized information so that the ER system can perform serial number (or other unique identifier) lookup operations as well as model number, UPC, SKU or other non-unique identifier lookup operations. Thus, the instant invention enables non-serialized products to benefit from electronic registration in substantially the same manner that serialized products have and are currently benefiting from electronic registration. Of course, the non-serialized ER system described herein does not provide the same level of accuracy as a serialized ER system, in that actual sales date or sales location information on a specific product is not available for the non-serialized products. However, the information provided by the non-serialized ER system is still very useful in making logical decisions about whether or not products qualify for return or warranty repair/replacement based on the last sale date information in the system for each class or group (e.g., UPCs) of products.

BRIEF DESCRIPTION OF THE DRAWINGS

The invention will be further understood by review of the following detailed description of the invention when read in conjunction with the appended drawings, in which.

DETAILED DESCRIPTION OF THE DRAWINGS

The preferred embodiment of the instant invention will now be described with reference to the drawings. It is noted that this description of the invention is only exemplary and is not meant to limit the invention beyond the express scope of the appended claims.

Figure 1:
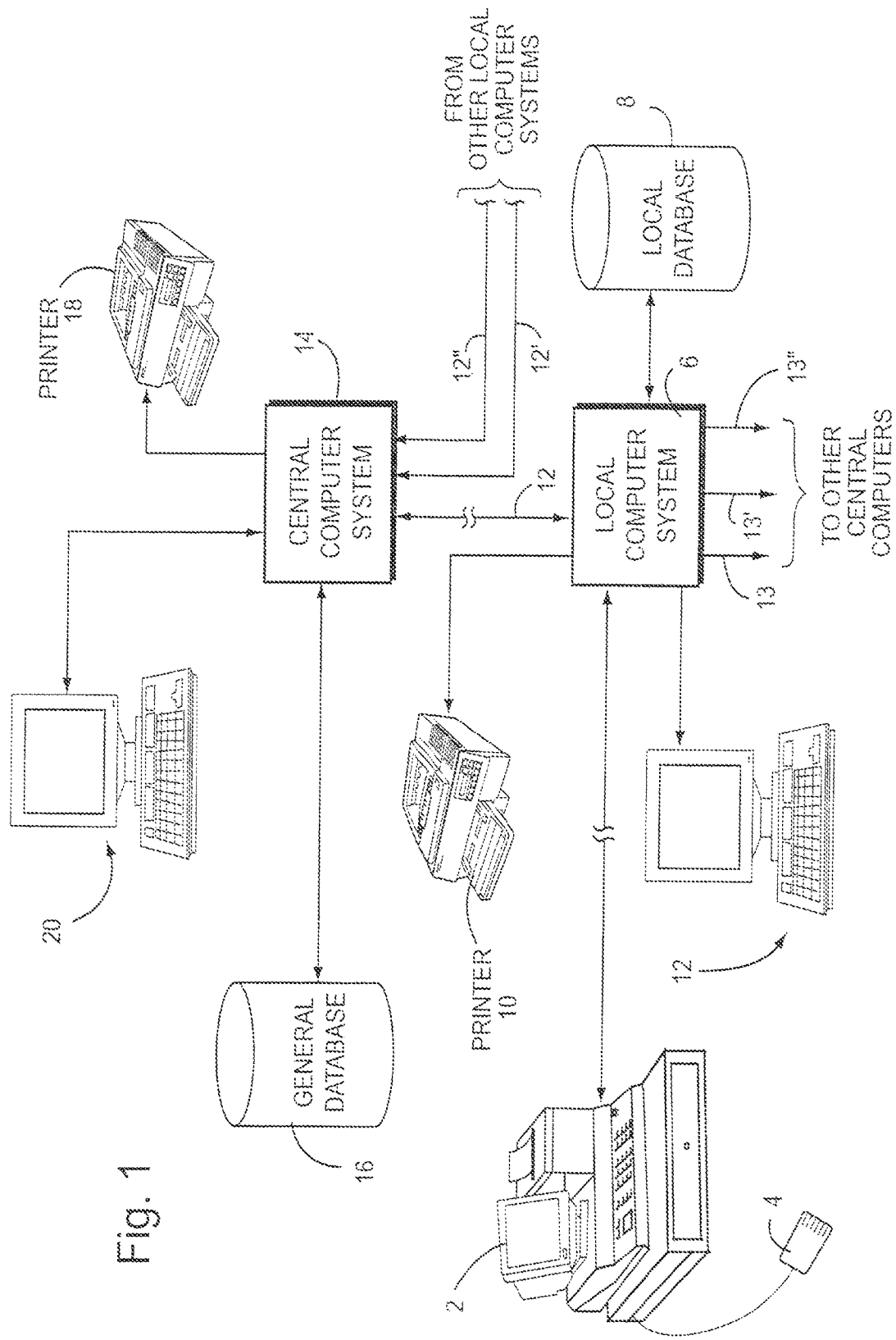
FIG. 1 is an schematic view of an exemplary electronic registration system that can be used in connection with the instant invention.

FIG. 1 shows an exemplary electronic registration (ER) system of the type described in the ER patents identified above. In such ER systems, products are registered at the point of sale using a unique identifier, such as a serial number, that uniquely identifies the product involved in a sales transaction. By storing the unique identifier along with a date associated with the transaction, as well as return policy information, ER enables prompt, efficient and accurate return transactions to be performed in connection with product returns using the ER system.

As shown in FIG. 1, a typical ER system includes a point of sale (POS) transaction register 2, preferably having a scanner or wand 4 associated therewith. The scanner or wand enables efficient and accurate reading of information, such as a UPC and/or serial number, off a product, product packaging, electronic tag (such as an RFID tag) or other such device or indicia. The register 2 is connected to a local computer system 6 having local database 8 for storing the transaction information obtained by POS register 2. The local computer system typically has a user terminal 12 and printer 10 connected thereto for accessing and controlling the local computer system 6. The local computer system is, for example, a retailer store computer system and may be connected to other computer systems via channels 13. The local computer system 6 is also preferable connected to a central ER computer system 14 having an associated database 16 which acts as a master ER database. The central computer system 14 also includes a terminal 20 and a printer used in connection with its ER functions. The central computer system 14 is also preferably connected to other local computer systems over channels 12, so that it contains registration information from many retail locations covering many different manufacturer's products.

The instant non-serialized ER system is preferably implemented using substantially the same conventional ER system described above. In accordance with the invention, the conventional ER system is modified to accept non-serialized registrations and associated return criteria, as explained in detail below.

In accordance with the invention, non-unique product identifiers, such as product model numbers, UPCs, SKUs or the like, are loaded into a database system, such as an electronic product registration system. The loaded UPCs, for example, define products for which the system will be able to provide return qualification information to a requesting party. Thus, if a retailer or other party desires to utilize the system for the purpose of reducing the number of unauthorized returns, that party provides the UPCs of interest (or other non-unique product identifiers) so that they can be loaded into the ER system. The party then also defines a return/warranty policy for each different UPC that has been loaded into the ER system. Alternatively, the party may simply provide a global return policy covering all of its non-serialized products. The policies are preferably based on some information that relates to the last sale date (or other key date, such as last ship date) having the particular UPCs. For example, a policy may state that products having a certain model number or UPC cannot be returned X days (e.g., 90 days) after the last date on which a product having that UPC was sold by the retailer. The term "sale date" is used loosely herein, and covers any date that at least closely approximates the sale date, such as the date that the non-serialized sales information is transmitted to the ER system.

In this way, the ER system knows that a product having a certain model number, UPC or SKU was last sold on a certain date (or approximate date). This information, combined with the return policy connected to this non-serialized product, enables the ER system to determine whether or not it is possible for a product corresponding to that UPC to qualify for return on a specific date. Of course, this system may allow some improper returns, due to the fact that there is no way to know exactly when a particular product having the UPC was purchased. However, the system at least can provide a logical cut-off date for returns based on the last sale (or other key) date for all products having that UPC, thereby still operating to reduce the number of unauthorized returns. In other words, the ER system basically assumes that all products having that UPC were purchased on the date the last product having that UPC was purchased (even though this is likely not the case). This enables decisions to be made as to return qualification based on these last dates. The system of the instant invention is particularly useful in reducing improper returns that, for example, are presented for return long after the retailer has stopped selling a particular product. Any suitable policy can be used in accordance with the system for a group (or groups) of products having the same non-unique product identifier depending on the particular desires of each retailer (or possibly manufacturer) that participates in the non-serialized ER program.

Once the non-serialized products have been registered, as described above, access to the ER system can be provided through, for example, a VRU system or a fully computerized look-up system. In the computerized system, the user would access the ER system through a web site or other computer communication and then be prompted for the model number, UPC or other non-unique identifier. The ER system would then look up the associated return/warranty policy for the product and provide non-serialized return qualification information back to the user through the computer system (or through a VRU system).

As explained above, rather than sending a product serial number query to a database, a non-unique identifier, such as a product model number, is accepted by the ER system and is sent to the database. As will be understood by those skilled in the art, a product serial number is unique for each product, whereas more than one product (typically the same type of products) may have a non-unique identifier such as a product model number or UPC. While the description herein may refer to "UPC", those skilled in the art will understand that any non-unique identifier or other indicia could be used in connection with the non-serialized system of the instant invention.

In one embodiment of the instant invention, the ER system handles serial number lookups and UPC (or non-serialized) lookups. The ER system will then access the appropriate database based on the selection. If a serial number lookup query is requested, serial number registration information is retrieved from the system, as described, for example, in the above-referenced U.S. Patents. On the other hand, if return qualification information for a product model number, UPC of other non-uniquely identified product is requested, then qualification information relating to all products having that model number, UPC etc. is provided by the ER system. Thus, the instant invention enables users (such as sales clerks or purchasers) to obtain information regarding return, warranty, replacement and/or repair of previously purchased products using product model number (or other non-serialized) information and without the need for specific information (e.g., serial number, purchase date/time and/or individual transaction information) being obtained at the time the specific product is actually purchased.

By using a model number lookup rather than a serial number lookup, a retailer can effectively control the return, warranty, replacement and/or repair of purchased products even if the retailer did not collect any serialized information at the time the products were purchased. In accordance with the invention, no information regarding the individual purchase transactions, particular purchase dates/times and/or serial numbers is needed to provide the non-serialized ER system in accordance with the instant invention. Instead, policy or criteria information is needed that relates to the entire class or group of products that are covered by the model number or other non-unique identifier (such as UPC). For example, a policy may be defined for a particular product model number such that any purchased product having that model number cannot be returned to a particular retailer X number of days after the last date on which that retailer sold a product having that model number. Once this policy is established in the ER system, the only other information needed by the ER system to function as described herein is the last date (or approximate last date) on which that retailer sold a product having that model number. This exemplary return policy can be instituted by the retailer and/or manufacturer without collecting any serialized information at the time of sale and can thus be instituted after some or all of the sales of the products having that particular model number are completed. As long as the return policy for that particular model number has been defined, the only additional information needed is the model number itself from the requester and the last sale date information. Serial number, purchase date/time and/or other specific transactional data at the time of sale (or any time thereafter) is not required.

A non-serialized ER system, as described herein, can generally be implemented and operated at a lower cost as compared to a serialized registration system, due to the fact that specific transaction data does not need to be provided to the non-serialized ER system for every product being registered. In addition, the products do not have to be assigned unique identifiers. Thus, a system which registers serial number, purchase date/time and/or other transactional information is not necessarily needed in order for the ER system of the instant invention to operate effectively to reduce the number of improper or fraudulent returns and/or warranty repair/replacement. Moreover, less storage space for non-serialized data and policy information is typically needed as compared to a serialized ER system. For the above reasons, the instant invention is particularly useful for relatively less expensive products or products not originally intended for ER registration. However, the improved ER system of the instant invention can be used for any suitable product.

Figure 2:
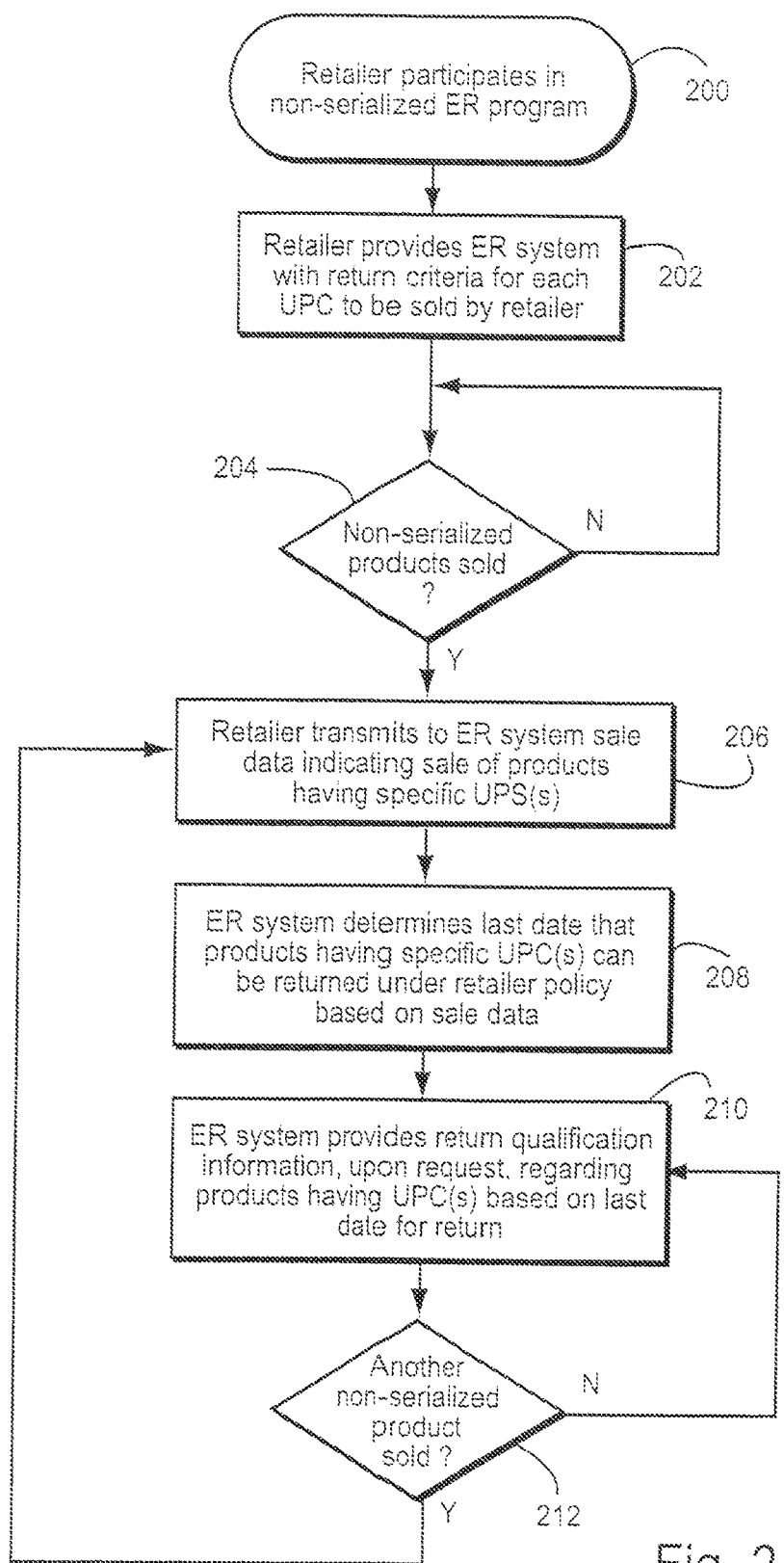
FIG. 2 is an exemplary overall block diagram illustrating the main steps that are performed in accordance with a preferred embodiment of the instant invention.

Referring now to FIG. 2, there is shown a flow chart of the main steps performed in accordance with a preferred embodiment of the instant invention. As shown in FIG. 2, the first step (step 200) involves signing up one or more retailers to participate in the non-serialized ER system. The participating retailers provide return (and/or warranty/replacement) criteria or policies to the operator of the ER system (or possibly directly to the ER system) for each group or class of products that the retailer desires to have registered in the ER system (step 202). Each policy is connected with a group (or groups) of products having the same non-unique identifier thereon (i.e., non-serialized products). As indicated above, this non-unique identifier could be a model number, UPC, SKU or any other suitable identifier that is used on the products. Each retailer is free to define its own policies.

The retailer then sells, in a conventional manner, non-serialized products having, for example, UPC numbers corresponding to those that have previously been identified to the ER system by the retailer as having a particular return policy. When the retailer sells a non-serialized products (step 204) the UPC (or SKU) is scanned or otherwise obtained at the point of sale and recorded within the retailers computer system. Throughout the sales day, many UPCs are collected which represent sold products for that day. At the end of the day, the retailer preferably transmits to the ER system a single UPC corresponding to each of the UPCs that were collected that day (step 206). By transmitting the UPCs for sold products, the ER system is able to determine that a sale has occurred that day for each of the transmitted UPCs. As a result, the ER system knows that a legitimate return of that product could occur for the next 90 days (assuming a 90 day return policy). Similarly, for any UPC in the ER system for which a UPC was not transmitted that day, the ER system knows that a legitimate return could only occur over the next 89 days in this example. In other words, based on the last date that a retailer has transmitted a UPC, the ER system determines the last possible day that a legitimate return can occur for that UPC (step 208). By transmitting the UPCs on a daily basis from each participating retailer, the ER system is able to make daily last return date determinations for all of the UPCs in the system and for each participating retailer, respectively. Preferably, the last return dates are retailer specific, meaning that each retailer may (and probably will) have a different last date for return for common UPCs, which is determined based on the last date they sold a product having that UPC and the retailer's specific return policy for that UPC.

While in the preferred embodiment the retailers transmit UPCs for purchased products each day, such frequent transmissions are not required. In fact, the retailer may choose to only provide the UPC list and associated sales dates on a periodic basis. However, the time between transmissions must be at least as frequent as the return policy itself for the system to work effectively. In this example, the ER system basically assumes after 90 days without a transmission for a specific UPC that the UPC is no longer being sold and that no further returns are permitted. However, should another UPC get transmitted (indicating a sale of a product having that UPC) after the 90 day period, the ER system resets the return period for another 90 days, thereby allowing return for that UPC for at least another 90 days and possibly longer if another corresponding UPC transmission occurs within the 90 days. In this way, the ER system constantly updates its database to reflect the calculated last return dates for each of the non-serialized products in its database based on the information it receives from the retailers (or other party).

In order to improve the operation of the non-serialized ER system with respect to reducing improper returns, retailers (and/or manufacturers) should change the UPC, SKU or other non-unique identifier used on its products periodically so that old products cannot be returned simply because a newer product having the same UPC has been sold within the legitimate return period. This situation can be avoided or at least minimized by changing the UPC fairly often, such as each time a new feature, color or other characteristic or the product changes or evolves, thereby effectively constituting a new and different product.

Once the ER system has the last return date stored for each UPC, the ER system can then be used for inquiries in a similar manner to the known serialized ER system. For example, a sales clerk being presented with a return accesses the ER system either by VRU, computer terminal or the like, and enters the non-unique identifier (e.g., UPC) on the product. The ER system then checks its database for the UPC and returns return qualification information (step 210) to the sales clerk (such as last date for return) that enables the sales clerk to make a determination as to whether or not it is possible for that product to still qualify for return under the applicable return criteria. The sales clerk is then able to proceed accordingly with respect to the attempted return (i.e., accept or reject the return).

As can be seen from the description herein, the instant invention enables non-serialized products to be registered in an ER system for the purpose of reducing the cost of product returns. While the non-serialized system is not as accurate as the serialized system with respect to return qualification determinations, the non-serialized system described herein still provides significant benefits to the retailer and manufacturer with respect to reducing unauthorized returns. The non-serialized system is also easier to implement and less information intensive due to, for example to the fact that information on every product sale does not need to be transmitted to the ER system. Instead, transmission of a list containing a single reference to each different UPC for products sold each day (or within another suitable time period) will enable the system to operate as explained herein.

It is noted that the actual date of sale does not necessarily have to be transmitted to the ER system. Instead, the ER system could, for example, assume that the date the UPC is transmitted is the date of sale, or the retailer could transmit a date that is associated with the sale or other desired event other than the actual sale date.

Figure 3:
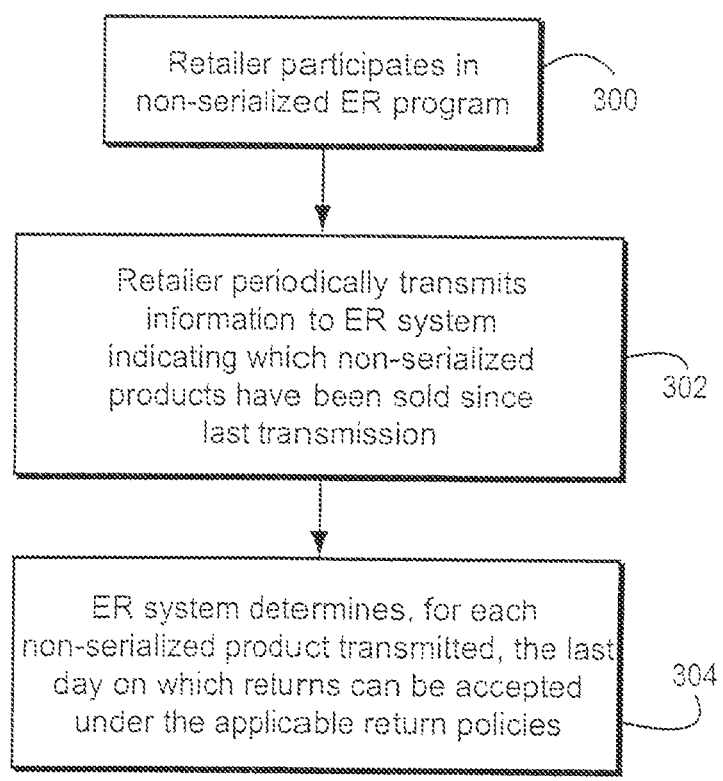
FIG. 3 is an exemplary block diagram of the main steps involved in initializing the ER system to handle non-serialized transactions.

FIG. 3 is an exemplary block diagram showing the main steps involved in setting-up or initializing a non-serialized ER system in accordance with the preferred embodiment of the instant invention. As shown in FIG. 3, and as described above, the process begins when a retailer begins its participation in a non-serialized ER program (step 300). The retailer periodically transmits information to the ER system which indicates which non-serialized products were sold since the last transmission and when. The transmission may be daily, but it need not be daily (step 302). For example, the retailer could simply send the information at intervals that correspond to the return period(s) for the products. For example, if the return period is 90 days, the retailer could simply send the information at the end of each 90 day period, thereby providing the ER system information as to which products should have their return periods reset by the ER system. Any other suitable period between transmission that satisfies a business rule may be used. The retailer also provides the ER system with information that defines return policies for the non-serialized products. Based on the transmitted information, the ER system determines, for each non-serialized product referenced in the transmission, the last day on which returns should be accepted under the applicable return policies of the retailer to which a return is presented (step 304).

Figure 4:
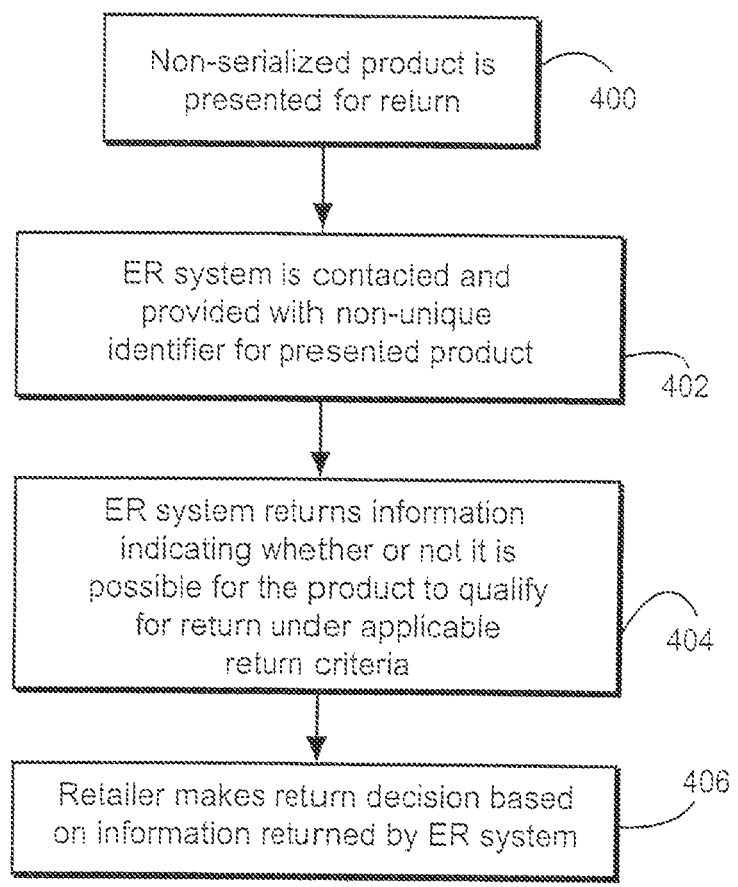
FIG. 4 is an exemplary block diagram of the main steps involved in using the ER system in connection with returns of non-serialized products.

FIG. 4 is an exemplary block diagram of the main steps involved in using the ER system in connection with returns of non-serialized products. As shown in FIG. 4, and as discussed above, the return process begins when a party presents a non-serialized product for return to a retailer (or other agent of a manufacturer)(step 400). The ER system is the contacted and provided with a non-unique identifier (such as UPC or SKU) for the product being presented for return (step 402). The ER system then checks its database for information on the non-serialized product. If no information is found, then the ER system reports this to the retailer so that the retailer can handle the return request in a conventional fashion without the benefit of ER. On the other hand, if information for the non-serialized product is found in the database, the ER system returns information to the retailer indicating the whether or not it is possible for the presented product to qualify for return under the applicable return policy using the previously transmitted information on non-serialized sales (step 404). The retailer then makes the decision on whether or not to accept the return based on the information provided by the ER system (step 406). In this way, the retailer can assure that returns are only accepted if it is at least possible for the product to qualify for return based on the last date that such a product was sold by that retailer. Thus, the non-serialized ER system of the instant invention is operable to reduce the number of improper returns as well as reducing the costs associated therewith. The system also helps with customer relations by providing information that can be used to explain to a customer why a return cannot be accepted.

While the preferred forms and embodiment of the instant invention have been illustrated and described, it will be apparent to those of ordinary skill in the art that various modification and/or changes may be made to the exemplary embodiment described above. Thus, the exemplary embodiment described above is not meant to limit the scope of the invention beyond the express scope of the appended claims.

What is claimed is:

1. A method for use with non-uniquely identified products, the method comprising:
    transmitting an inquiry to an electronic registration (ER) system when a non-uniquely identified product having a non-uniquely identified product type is presented in connection with a post-sale return and/or warranty request,
    the ER system including at least one processor and a database storing associations between registration dates and non-uniquely identified product types,
    the ER system, including the at least one processor, being configured to at least (a) make determinations as to last dates on which non-uniquely identified products can be accepted for return/warranty service using the database and based at least in part on the respective types of those products and the registration dates associated therewith, and (b) issue return/warranty service qualifications using the determinations and applicable return/warranty criteria; and
    receiving, from the ER system and in response to the inquiry, an issued qualification as to whether the presented non-uniquely identified product might qualify for return/warranty service under the applicable return/warranty criteria.

2. The method of claim 1, wherein product information used in making the associations is transmitted to the ER system on a daily basis.

3. The method of claim 2, wherein the product information is received from a plurality of different sources.

4. The method of claim 1, wherein products of the same type share a common non-unique identifier.

5. The method of claim 4, wherein the common non-unique identifier is a UPC.

6. The method of claim 1, wherein qualifications are based on comparisons between last dates associated with inquired about product types, dates inquiries are made, and applicable return/warranty criteria.

7. The method of claim 1, wherein the ER system is configured to accept and respond to requests regarding uniquely identified products.

8. The method of claim 1, further comprising collecting serialized registration data if possible, and then transmitting collected serialized registration data to the ER system.

9. The method of claim 1, wherein the ER system is located remotely from where the non-uniquely identified product is presented for return.

* * * * *